United States Patent

Webb

[11] 4,049,482
[45] Sept. 20, 1977

[54] METHOD AND APPARATUS FOR FORMING FLANGES

[76] Inventor: James W. Webb, 301 Hargett, Clute, Tex. 77531

[21] Appl. No.: 662,261

[22] Filed: Feb. 27, 1976

[51] Int. Cl.² .......................................... B65H 81/00
[52] U.S. Cl. .................................. 156/172; 138/109; 156/392; 156/429; 285/423
[58] Field of Search ............... 156/161, 162, 165, 169, 156/172, 175, 185, 187, 191, 425, 429, 430, 431, 446, 447, 391, 392; 285/427, DIG. 20; 242/7.19, 7.22, 7.21; 138/DIG. 2, 109, 129, 172, 176; 242/72; 279/2 R; 251/358, 368

[56] References Cited

U.S. PATENT DOCUMENTS

| | | | |
|---|---|---|---|
| 1,719,738 | 7/1929 | Wayne | 156/425 |
| 2,383,582 | 8/1945 | Barbehenn | 156/191 |
| 3,188,017 | 6/1965 | Orton, Jr. | 242/72 |
| 3,436,995 | 4/1969 | Blair | 279/2 |
| 3,616,063 | 10/1971 | Bradley | 156/429 |
| 3,623,930 | 11/1971 | Grosh | 156/175 |

Primary Examiner—Charles E. Van Horn
Assistant Examiner—Michael W. Ball
Attorney, Agent, or Firm—Pravel, Wilson & Gambrell

[57] ABSTRACT

A method and apparatus for forming flanges of fiberglass reinforced plastic on a tubular member, the method including the steps of soaking at least one fiberglass strand which is directed to a rotating tubular member whereinafter such strand is wound and laterally distributed about the tubular member forming a plurality of layers with such layers being constrained to form an annular flange on the tubular member of a predetermined axial cross sectional width and height.

7 Claims, 5 Drawing Figures

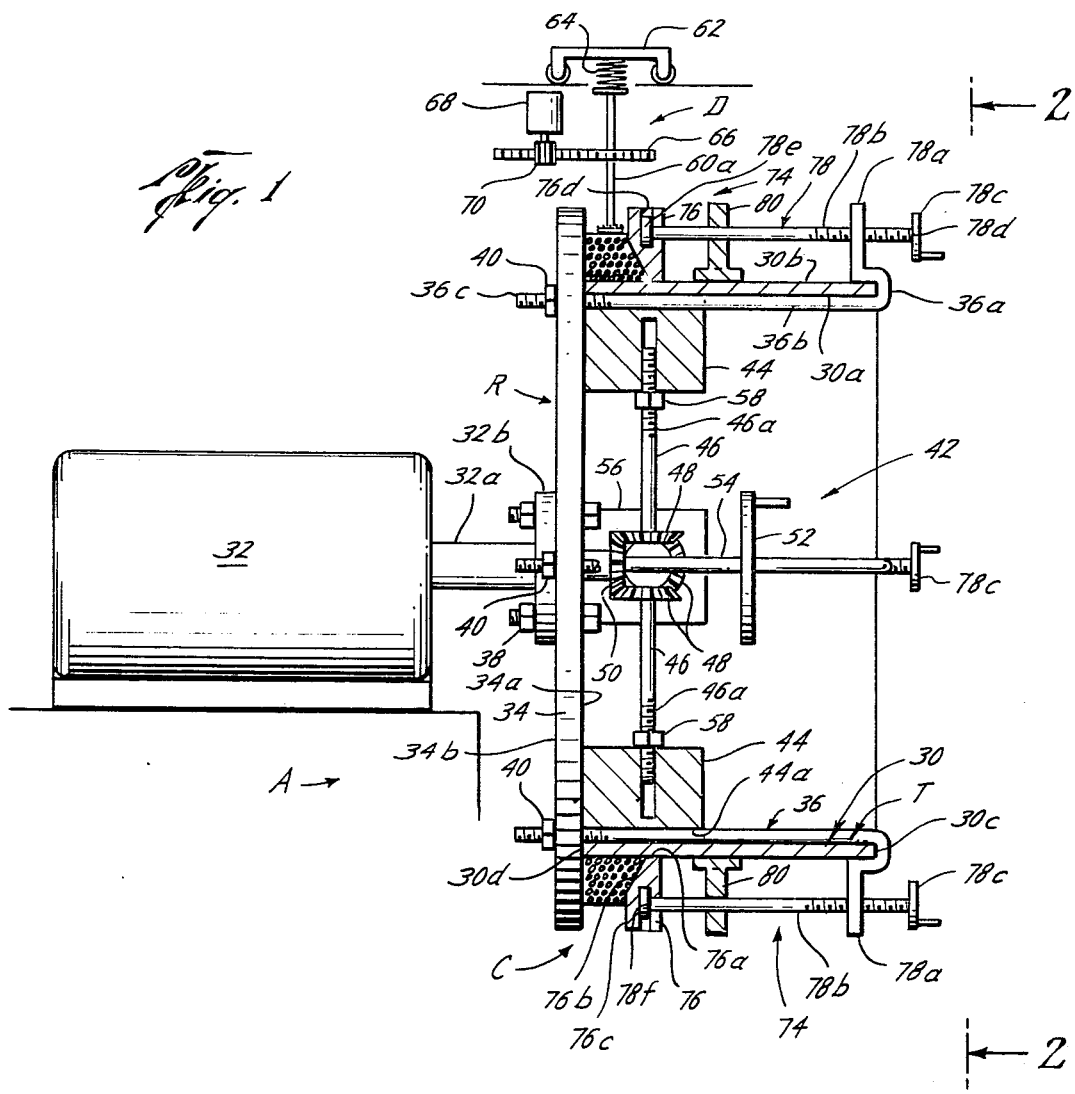
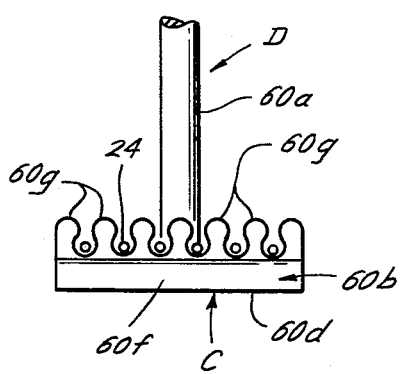
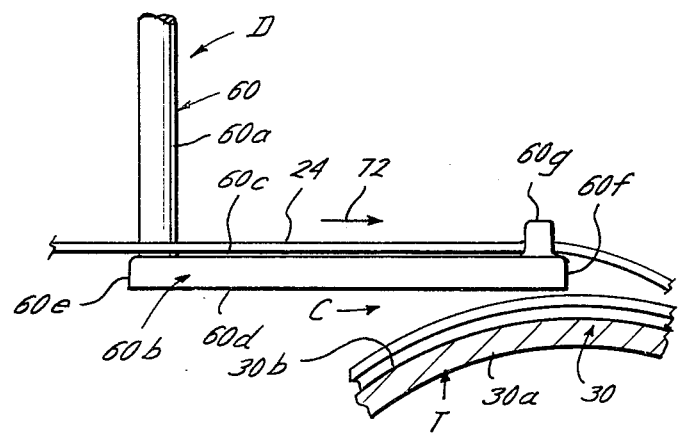

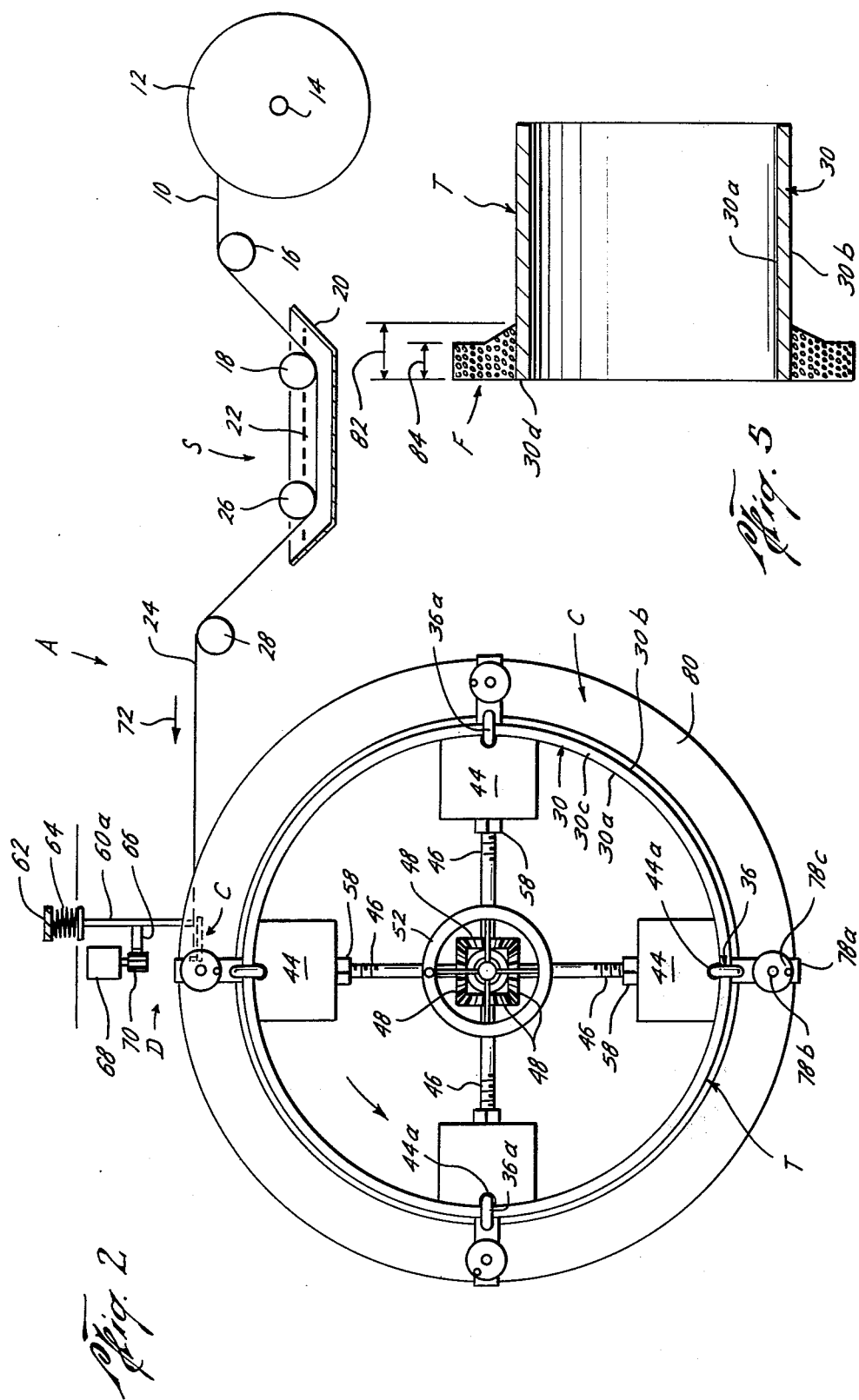

METHOD AND APPARATUS FOR FORMING FLANGES

BACKGROUND OF THE INVENTION

The field of this invention is flange making devices and methods for making same, particularly of the type used for forming flanges of fiberglass reinforced plastic on a tubular member.

Prior art flange making methods and apparatus include those such as disclosed in U.S. Pat. Nos. 3,819,450; 3,796,620; 3,791,900; 3,645,820; and, 3,617,414. Most of the prior art is directed towards forming tubular members out a resin coated fiberglass roving rather than flange forming, particularly having a flange being formed of a different material than that of the tubular member about which the flange is found.

Problems found in the prior art include those of long intervals of time, such as 16-20 hours, necessary to form such a fiberglass flange. Furthermore, problems are encountered in bonding failure between the multiple layers of fiberglass rovings as well as between the bonding of the annular flange to the exterior surface of the tubular member.

SUMMARY OF THE INVENTION

The present invention provides a new and improved method and apparatus for forming flanges, the method including soaking at least one fiberglass strand with a resin prior to directing such strand to a rotating tubular member whereinafter the strand is wound and laterally distributed on the rotating tubular member to form a plurality of layers with such layers being constrained on the tubular memer to form an annular flange of a predetermined axial cross sectional width and height.

BRIEF DESCRIPTION OF THE DRAWINGS

FIG. 1 is a side view of the flange making device of the present invention;

FIG. 2 is a front view of the flange making device of the present invention, taken along lines 2—2 of FIG. 1, and schematically illustrating the method for making such flanges;

FIG. 3 is an enlarged, front view of the fingers of the distribution header of the present invention;

FIG. 4 is a side view of the fingers and platform of the distribution header of the present invention, as shown in FIG. 3; and, FIG. 5 is a tubular member having a finished annular flange formed therewith.

DESCRIPTION OF THE PREFERRED EMBODIMENT

In the drawings, the letter A designates the apparatus for forming flanges F of the present invention. The apparatus A forms a flange F by directing a fiberglass strand 10 to a soaking means S, to a distribution means D which winds and laterally distributes a resin soaked fiberglass strand 24 to a tubular member T being rotated by rotating means R, with such layers being constrained by constraining means C to form the annular flange F on the tubular member T.

The flange F is formed primarily of a fiberglass strand or roving 10 which is typically commercially available in large rolls or spools 12. The spools 12 may be placed on a suitable axle 14 such that the spool 12 is allowed to reel the fiberglas strand 10 freely therefrom upon rotation of the spool 12. By means of rollers 16, 18, the fiberglass strand 10 is directed into a soaking means S. Preferably, the soaking means S includes a tub or bath 20 capable of retaining an appropriate amount of suitable resin 22. In the bath 20, the resin 22 thoroughly coats the fiberglass strand 10 resulting in resin coated fiberglass strand 24. The resin coated fiberglass strand 24 is directed outwardly from the bath 20 by rollers 26, 28 and directed to the distribution means D.

The distribution means D directs the resin soaked fiberglass strand 24 from the soaking means S to the tubular member T where the resin coated fiberglass strand 24 is wrapped about the tubular member T for forming an annular flange F of a predetermined axial cross sectional width and height on the tubular member T, as more fully discussed hereinbelow.

The tubular member T may be formed of any desired material, be it plastic, metal or any other suitable tubular material. The tubular member T may be of any desired length and includes tubular member 30. Tubular member 30 has an interior annular surface 30a, an outer annular surface 30b, and end portions 30c, 30d (FIGS. 1, 2, 5).

The tubular member T is adapted to be rotated by rotating means R. The rotating means R includes a motor means 22, face plate 34 and mounting arms 36. The motor means 32 may be of any motive power source, such as electrical, hydraulic, pneumatic motors or any other suitable internal-external combustion engine suitable to perform the desired duty. The motor means 32 has a shaft 32a having a mounting plate 32b rigidly affixed thereto (FIG. 1). Suitable openings (not shown) are formed in the mounting plate 32b and adapted to conform to suitable openings (not shown) formed in the face plate 34 allowing suitable fasteners 38, such as bolts or the like, to mount the face plate 34 with the motor means 32.

The face plate 34 is preferably formed of steel, cast iron or any suitable high-strength material capable of withstanding the stresses and strains necessary for supporting and rotating a tubular member 30 while forming the flange F with the apparatus A of the present invention. The face plate 34 is preferably of a circular configuration having inner surface 34a and outer surface 34b. The face plate 34 further includes openings (not shown) adapted to receive mounting arms 36 which are used to mount the tubular member 30 with the face plate 34.

The mounting arms 36 preferably include a U-shaped end portion 36a, an elongate portion 36b and a threaded shank 36c (FIG. 1). The U-shaped end portion 36a is adapted to engage end portion 30c of tubular member 30 with the elongate portion 36b lying contiguous with interior annular surface 30a of the tubular member 30 along its longitudinal axis with the threaded shank 36c extending through opening (not shown) in the face plate 34 such that a suitable fastener as nut 40 may be threaded onto threaded shank 36c such that the tubular member 30 may be securely fastened to face plate 34. It will be appreciated that by varying the locations of the openings formed in the face plate 34, the mounting arms 36 may accommodate a tubular member T of varying diameters. Alternatively, the face plate 34 may be easily removed and an appropriately sized face plate 34 correponding to a particular tubular member T used as a replacement by removal of fasteners 38 and the reassembly thereof. As shown in FIG. 2, preferably four mounting arms 36 are used for securing the tubular member 30 with the face plate 34, but, any suitable number of mounting arms 36 may be used. Prior to securely fastening the tubular member 30 to the face plate 34, the tubular member 30 should be properly aligned with the axis of rotation of the motor means 32, which is so accomplished by centralizing means, generally designated as 42.

The centralizing means 42 allows the tubular member 30 to be properly aligned and oriented with respect to the axis of rotation of the motor means 32 which, for smooth operation of the apparatus A of the present invention, should coincide with the longitudinal axis of motor shaft 32a. The centralizing means 42 prevents any rotating unbalance and discourages any lopsided winding of the resin coated strand 24 about the tubular member 30. The centralizing means 42 includes centralizing dogs 44, centralizing arms 46, pinion gears 48, idler gear 50 having crank 52 attached thereto by crank shaft 54, all of which are appropriately affixed to the face plate 34 by a suitable housing 56. Rotation of crank gear 52 results in rotation of idler gear 50 which engages pinion gears 48 affixed to each centralizing arm 46. Rotation of each centralizing arm 46 results in an inwardly-outwardly responsive movement of the centralizing dogs 44 with respect to the axis of rotation of the shaft 32a of motor means 32. Each of the individual centralizing dogs 44 are individually adjustable with respect to its own individual centralizing arm 46 by an appropriate threaded ring or nut 58 mounted on each threaded portion 46a of each centralizing arm 46. Each of the centralizing dogs 44 has an appropriate slot 44a formed therein allowing the mounting arms 36 to be mounted with the centralizing dogs 44 adjacent slot 44a.

When the tubular member 30 is mounted with the face plate 34, the crank 52 is turned in the appropriate direction such that the centralizing dogs 44 are in a retracted position. The tubular member 30 is positioned adjacent the face plate 34 with the U-shaped end portions 36a of the mounting arms 36 engaging end 30c of the tubular member with the mounting arms 36 loosely fastened to the face plate 34 by nuts 40. Thereafter, the crank 52 is rotated such that the centralizing dogs 44 expend radially outwardly to engage the interior annular surface 30a of the tubular member 30 adjacent end portion 30d of the tubular member 30 for aligning the tubular member 30 with the axis of rotation of motor means 32 such that the tubular member 30 may be appropriately rotated by the rotating means R. Thereafter, nuts 40 are firmly fastened to secure the tubular member 30 in an aligned position on the face plate 34.

Distribution means D permits winding and lateral distribution of the resin soaked fiberglass strand 24 on the tubular member 30 while the tubular member 30 is rotated by the rotating means R. The distribution means D includes a distribution header 60 (FIGS. 1, 2, 3, 4) including an upstanding portion 60a and a platform 60b. The upstanding portion 60a of the distribution header 60 is appropriately affixed to a suitable movable support 62 by compressing means such as compressing spring 64. The rack 66 and motor 68 having a compatible gear 70 therewith for engaging rack 66 allows movement of the distribution means D along the longitudinal axis of the tubular member 30. The rack 66-motor 68 arrangement may be substituted with any other suitable drive means such as a friction disk or a slip disk allowing limited angular movement of the distribution means D or any other suitable arrangement for moving the distribution means D along the length of the tubular member 30 adjacent the flange F to be formed.

The platform 60b of the distribution header 60 includes an upper surface 60c, lower surface 60d and end portions 60e, 60f. A plurality of flanges 606 are formed adjacent end portion 60f on the upper surface 60c of the platform 60b. The upper surface 60c is adapted to receive the resin coated fiberglass strand 24 moving in the direction of arrow 72 (FIGS. 2, 4). As such, the resin coated strand 24 is directed between adjacent fingers 60g which act as a guide for the strand 24. As is shown in FIG. 3, the distribution header 60 is adapted to simultaneously receive a plurality of strands 24 should such be desired. Preferably, the distribution header 60 is oriented such that the end portion 60f of the platform 60b is substantially tangent to the tubular member 30 adjacent the uppermost portion thereof as shown in FIGS. 2, 4, with the upstanding portion 60a being offset from end portion 60f, as more fully discussed hereinbelow.

The apparatus A of the present invention forms the flange F by rotating the tubular member T by rotating means R such that the resin coated strands 24 are wound and laterally distributed by the distribution means D about the tubular member T and constrained by constraining means C for forming the annular flange F on the tubular member T. The constraining means C permits formation of the annular flange F on the tubular member T of a predetermined axial cross sectional width and thickness. The constraining means C includes a guide member assembly, generally referred to as 74 which includes a guide member 76 spaced from the face plate 34. The guide member 76 is preferably of an annular, ring configuration having an inner annular surface 76a of substantially the same diameter as that of the outer annular surface 30b of the tubular member 30. The guide member 76 further includes an inclined interior surface 76b and a vertical interior surface 76c as described more fully hereinbelow.

The guide member 76 is adapted to move along the longitudinal axis of the tubular member 30 about the outer annular surface 30b by crank mechanism 78. The crank mechanism 78 includes a crank support 78a preferably rigidly affixed to or formed with the U-shaped end portion 36a of mounting arms 36. The crank shaft support 78a preferably has a threaded opening (not shown) wherein threaded shaft 78b extends therethrough having a crank 78c adjacent end 78d of shaft 78b and disk 78e formed adjacent end 78f of shaft 78b. The disk 78e is adapted to be received in slot 76d formed in the guide member 76. Ring support 80 provides intermediate support for the shaft 76b therebetween support 78a and guide member 76. Rotation of crank 78c results in the threaded portion of shaft 78b moving inwardly or outwardly with respect to support 78a resulting in the guide member 76 moving inwardly or outwardly, respectively, with respect to inner surface 34a of the face plate 34.

As shown in FIG. 4, the resin coated fiberglass strands 24 are directed from the platform 60b through fingers 60g onto the outer annular surface 30b of the tubular member 30 as the tubular member 30 is rotated by the rotating means R. Further, the resin coated fiberglass strands 24 are constrained between the surfaces 76b, 76c of guide member 76 and the inner surface 34a of the face plate 34 which determines the overall axial cross sectional width of the flange F. Rotation of the tubular member 30 results in the formation of multiple layers of resin coated fiberglass strands 24 being constrained between the face plate 34 and guide member 76.

Furthermore, the lower surface 60d of the platform 60b adjacent end 60f acts as a compacting means wherein compression spring 64 exerts a compression force on the wound layers of resin soaked fiberglass strands 24 to prevent voids from being formed in such plural layers as well as promoting uniform packing density of such fiberglass strands 24 for the annular flange F.

Therefore, to form a flange F on the apparatus A of the present invention, the tubular mounting member T is mounted to the face plate 34 by mounting arms 36, being centralized by centralizing means 42 for alignment with the axis of rotation of the rotating means R. The proper adjustment of the guide member assembly 74 is predetermined whereinafter the guide member 76 is spaced an appropriate distance from the inner surface 34a of the face plate 34. This adjustment regulates the axial cross sectional width of the flange F. Thereafter, the rotating means R is activated resulting in the tubular member T being rotated. The fiberglass strand 10 from spool 12 is fed through bath 20 with resin 22 therein resulting in the resin coated strand being directed towards the distribution means D. The resin coated fiberglass strand 24 moving in the direction of arrow 72 is directed over the upper surface 60c of the platform 60b and through upstanding fingers 60b and fed onto the rotating tubular member T. The platform 60b moves laterally along the longitudinal axis of the tubular member T by appropriate movement of the gear 70 by motor 68 in engagement with both the rack 66 and upstanding portion 60a of the distribution header 60. Thus, as the resin coated fiberglass strand 24 is wrapped about the rotating tubular member T between the face plate 34 and guide member 76, succeeding layers of the resin coated fiberglass strand 24 are built up, as shown in FIG. 4, with the end 60f of the platform 60b acting to compact the layers of strands 24 as they are wrapped about the tubular member T. The upstanding fingers 60g act to prevent tangling of such resin coated strands 24 should a plurality of such strands be used during the flange forming operation. Due to the inclined surface 76b of the guide member 76, the axial cross sectional width of the flange F has an inner flange width 82 (FIG. 5) that is greater adjacent the tubular member T than the outer flange width 84 adjacent the outermost perimeter of the flange F. When the predetermined thickness of the flange F is reached, the resin coated fiberglass strands 24 are cut and the final rotation and compacting results in a smooth exterior outside perimeter of the flange F.

In contradistinction to many prior art devices wherein strand-formed flanges required 16–20 hours for such a flange to set up, the apparatus A of the present invention provides for the complete flange making process in 20–30 minutes time. After the flange F has cured on the apparatus A of the present invention, the guide member 76, the centralizing means 42, and the mounting arms 36 are loosened and/or removed to facilitate removal of the tubular member T and flange F therewith from the face plate 34 resulting in the finished flanged tubular member assembly of FIG. 5.

Typically, for a proper flange forming operation, the flange is formed of approximately 70% fiberglass strands 10 and 30% resin 22. Further, the rotating means, for example should rotate the tubular member approximately one revolution per second. Typically, such fiberglass-resin reactions are highly exothermic which tend to result in poor bonding to a tubular member T and/or separation of the multiple layers of strands 24. However, because the resin coated fiberglass strands 24 are wrapped about the tubular member T, a better bond results therebetween the tubular member T and flange F because of internal shrinkage during curing towards the center of the tubular member T. The guide member 76 and face plate 34 as well as the platform 60d all provide and prevent warpage when the flange F is curing where, in contradistinction, prior flanges tended to pull away from such a tubular member during curing.

Further, the method and apparatus A of the present invention can be performed on any length of tubular member inasmuch as the tubular member is horizontally disposed rather than many of the prior art flange making processes wherein the width of the flanges F were limited because the tubular member was required to be vertically oriented. Thus, the method and apparatus A of the present invention for forming a flange F on a tubular member T provides a new and improved, quick, economical, and readily adjustable device and method for forming annular flanges F on any tubular member T.

The foregoing disclosure and description of the invention are illustrative and explanatory thereof, and various changes in the size, shape and materials as well as in the details of the illustrated construction may be made without departing from the spirit of the invention.

I claim:
1. A method for forming flanges of fiberglass reinforced plastic on a tubular member, comprising the steps of:
   soaking at least one fiberglass strand with a resin;
   mounting the tubular member with a face plate;
   rotating the face plate having the tubular member therewith;
   directing the resin soaked fiberglass strand to the rotating tubular member;
   winding the resin soaked fiberglass strand on the tubular member while the tubular member is rotated to form a plurality of layers;
   laterally distributing the resin soaked fiberglass strand on the tubular member between the face plate and an adjustable guide member assembly mounted with the face plate and disposed about the tubular member for forming an annular flange of a predetermined axial cross-sectional width; and
   compacting the fiberglass strand on the tubular member by moving a distribution header laterally of the tubular member for providing substantially uniform compacting of the strands and substantially uniform axial cross-sectional height of the flange.
2. The method of claim 1, wherein:
   said soaking includes the step of soaking a plurality of strands with a resin; and,
   said distributing includes the step of separating the plurality of strands prior to winding and laterally distributing to prevent tangling of the plural strands upon the rotating tubular member.
3. The method of claim 1, further including the step of:
   forming the annular flange on the tubular member with the axial cross sectional width of the flange having an inner flange width greater than the outer flange width.
4. An apparatus for forming an annular flange of fiberglass reinforced plastic on a tubular member, comprising:
   means for soaking at least one fiberglass strand with a resin;

a face plate for mounting the tubular member therewith;

means for rotating said face plate having the tubular member therewith;

a guide member adapted to be positioned about the tubular member and mounted with said face plate;

distribution means with said rotating means for distributing said resin soaked fiberglass strand between said face plate and said guide member on the tubular member, said distribution means permitting winding and lateral distribution of said resin soaked fiberglass strand on the tubular member while the tubular member is rotated by said rotating means to form an annular flange of a plurality of layers having a predetermined axial cross-sectional width; and compacting means for compacting said layers of resin soaked fiberglass strands to prevent undesired voids being formed in said plural layers as well as to promote uniform packing density of said fiberglass strand for the annular flange, said compacting means being integral with said distribution means.

5. The apparatus of claim 4, further including:

means for centralizing the tubular member with respect to the axis of rotation of said rotating means, said centralizing means mounted with said rotating means.

6. The apparatus of claim 3 wherein said distributing means further includes:

a distribution header for laterally moving along the longitudinal axis of the tubular member adjacent the outer exterior surface of the tubular member permitting formation of flanges of predetermined widths and heights, said distribution header adapted to simultaneously distribute a plurality of strands about the tubular member for forming the annular flange.

7. The apparatus of claim 6, wherein said distribution header includes:

means for separating said plural strands for preventing said strands from becoming tangled to promote uniform packing about the tubular member as the tubular member is rotated for formation of the annular flange.

* * * * *